US006829566B2

(12) United States Patent
Sage

(10) Patent No.: US 6,829,566 B2
(45) Date of Patent: Dec. 7, 2004

(54) PIPE NETWORK OPTIMIZATION

(75) Inventor: Paul Sage, Cheshire (GB)

(73) Assignee: United Utilities, PLC, Cheshire (GB)

( * ) Notice: Subject to any disclaimer, the term of this patent is extended or adjusted under 35 U.S.C. 154(b) by 209 days.

(21) Appl. No.: 10/088,831

(22) PCT Filed: Jul. 25, 2001

(86) PCT No.: PCT/GB01/03349

§ 371 (c)(1),
(2), (4) Date: Jul. 30, 2002

(87) PCT Pub. No.: WO02/08975

PCT Pub. Date: Jan. 31, 2002

(65) Prior Publication Data

US 2003/0033117 A1 Feb. 13, 2003

(30) Foreign Application Priority Data

Jul. 25, 2000 (GB) .............................................. 0018158

(51) Int. Cl.[7] .............................................. G21C 17/00
(52) U.S. Cl. .............................. 702/183; 702/45; 703/9
(58) Field of Search .............................. 702/33, 36, 45, 702/50, 55, 100, 105, 114, 140, 155, 183; 703/9, 10, 21, 22, 14, 24; 73/152.27, 152.28, 152.29, 14, 24

(56) References Cited

U.S. PATENT DOCUMENTS

| 4,200,911 A | | 4/1980 | Matsumoto ................. 364/105 |
| 4,586,144 A | * | 4/1986 | Fukumoto .................... 702/45 |
| 4,712,182 A | * | 12/1987 | Wakamori et al. ............ 702/36 |
| 4,835,687 A | * | 5/1989 | Martin ........................... 705/7 |
| 5,062,068 A | * | 10/1991 | Kondo et al. .................... 703/9 |
| 5,388,455 A | * | 2/1995 | Hamby et al. ........... 73/152.29 |

OTHER PUBLICATIONS

M. Collins et al.: "Solving the Pipe Network Analysis Problem Using Optomization Techniques," Management Science, vol. 24, No. 7, Mar. 1978, pp. 747–760, XP001033599, USA, p. 748, Line 7, p. 755, Line 20.

J. Zhang et al.: "A Bilevel Programming Method for Pipe Network Optomization," Siam Journal on Optimization, vol. 6, No. 3, Aug. 1996, pp. 838–857, XP001032941, USA, p. 839, Line 1, p. 842, Line 24.

G. Xue et al.: "Computing the Minimum Cost Pipe Network Interconnecting One Sick and Many Sources," Siam Journal of Optomization, vol. 10, No. 1, 1999, pp. 22–42, XP001032937, USA, p. 23, Line 27, p. 29, Line 34.

E. Mathews et al.: "A Numberical Optomization Procedure for Complex Pipe and Duct Network Design," Int. J. Num. Meth. Heat Fluid Flow, vol. 5, No. 5, Jul. 1995, pp. 445–457, XP001033595, UK, p. 451, Line 9, p. 452, Line 6.

T. Lekane et al.: "Long–Term Optomization Model of Tree Water Networks," Eur. J. Oper. Res., vol. 4, No. 1, Jan. 1980, pp. 7–15, XP001033597, The Netherlands, p. 8, Left–hand column, Line 36, p. 11, Right–hand column, Line 34.

D. Savic et al. "Genetic Operators and Constraint Handling for Pipe Network Optimization," Selected Papers. Evolutionary Computing. AISB Workshop, Apr. 3, 1995, pp. 154–165, XP001033594, Germany, p. 155, Line 33, p. 158, Line 17.

* cited by examiner

Primary Examiner—Marc S. Hoff
(74) Attorney, Agent, or Firm—Michael Best & Friedrich, LLP

(57) ABSTRACT

A method of optimizing a model of pipe network with respect to a predetermined criteria, such as costs. In particular, the method provides an efficient way of minimizing the cost of rehabilitating a water pipe network. The invention provides a method of optimizing proposals for pipes within a network without violating operating criteria of the network. The invention further provides the methods of determining the hydraulic significance of pipes within a pipe network, and determining the peak flow requirements of each pipe.

54 Claims, 5 Drawing Sheets

| | SUPPLYING | | | | | | | |
|---|---|---|---|---|---|---|---|---|
| | P1 | P2 | P3 | P4 | P5 | P6 | P7 | P8 |
| FED | | | | | | | | |
| P1 | 1 | 0 | 1 | 1 | 1 | 1 | 1 | 1 |
| P2 | 0 | 1 | 1 | 1 | 1 | 1 | 1 | 1 |
| P3 | 0 | 0 | 1 | 0 | 1 | 1 | 1 | 1 |
| P4 | 0 | 0 | 0 | 1 | 0 | 0 | 1 | 1 |
| P5 | 0 | 0 | 0 | 0 | 1 | 0 | 1 | 1 |
| P6 | 0 | 0 | 0 | 0 | 0 | 1 | 0 | 1 |
| P7 | 0 | 0 | 0 | 0 | 0 | 0 | 1 | 1 |
| P8 | 0 | 0 | 0 | 0 | 0 | 0 | 0 | 1 |
| HS | 1 | 1 | 3 | 3 | 4 | 4 | 6 | 8 |

PIPE NETWORK OPTIMIZATION

The present invention relates to a method of optimising a pipe network. Particularly, but not exclusively, the invention relates to the optimisation of a pipe rehabilitation strategy for a pipe network such as a water supply network. More particularly still, the invention can provide a "least cost" acceptable strategy for the rehabilitation of a selection of pipes within a water supply network.

It is now conventional to use computer modelling in the design and operation of pipe networks. For instance, computer models of water mains networks are commercially available which provide a mathematical model of the physical properties of the network. Typically such a model will identify each pipe and other network elements (such as valves, pumps etc), giving the size, material and age etc (where this information is known) all of which may have an effect on performance of the network. Where precise details of pipe elements are not known assumptions may be made.

A water mains network will typically be divided into a number of separate district meter areas (DMAs) which will be separately modelled within the network model as a whole. A typical network will have half a dozen or so DMAs each having a designated source, which may be a real source such as a service reservoir, or a pseudo-source such as a trunk main. Alternatively, sources may be located further back upstream on trunk mains, with the modelled DMAs being supplied via branch mains off the trunk mains.

Within the network, and within each DMA, the network model will identify "nodes". The concept of nodes will be familiar to those skilled in the art of network analysis. Nodes are designated by the network model builder, or the original geographical survey of the physical network on which the model is based, and includes such things as pipe junctions, pressure points, and demand points (typically models for residential areas will have 20 to 30 houses allocated to each node). The points where individual service pipes for single properties branch from the network would not generally be considered as network nodes (although there may be exceptions to this, for instance for models that cover sparsely populated rural areas).

The information provided by a network model can be used in the analysis of the performance of the network. Software packages are commercially available which can perform a number of operations on a network model, including calculation of such properties as pressure gradients and flow directions and rates etc. The core of such programs is a mathematical solver often referred to as a "hydraulic engine". In addition to the hydraulic engine the software will also include a front end to interface with the user, a back end and appropriate additional modules such as display, graph and import/export engines. Such software packages will hereinafter be referred to as "network analysis tools".

One of the functions that conventional network analysis tools can provide is to predict the effect on a network (or on a DMA or part of a DMA) of changes made to certain elements within that network. As such, network analysis tools can be used when planning a rehabilitation strategy. Typically the network planner will have a number of performance constraints which must be accommodated, such as ensuring that rehabilitated pipes do not introduce an unacceptable steep hydraulic gradient (i.e. too much loss of pressure per unit length along a pipe line) but within those constraints the planner will be able to make a number of choices on rehabilitation technique, and the size of any new pipe or pipe lining that might be installed to rehabilitate the existing pipe. The network planner will have details of contractors which offer appropriate rehabilitation services and associated costs. Costs will typically vary not just with the rehabilitation technique, and size of any rehabilitated pipe, but also with location and ground conditions. For instance, it will be more expensive to dig up a main road than a side road etc. Usually the network planner will be constrained to select from a pre-agreed list of preferred contractors which have submitted acceptable tenders. This information is referred to hereinafter as a contractor "cost table" (regardless of whether or the information is in fact tabulated).

Normally, the planner will want to determine the cheapest acceptable strategy by reference to the relevant cost table. Where a single pipe or pipe element is to be rehabilitated performance predictions, and therefore design choices, are easily made. However, the process can be extremely complex where a number of changes are to be made at different parts of a network, many of which will impact on each other and on other parts of the network.

It is therefore an object of the present invention to provide a method of optimising a pipe network. In particular, it is an object of the invention to provide a method of determining a "least cost" acceptable solution when planning a pipe network rehabilitation strategy. The method according to the present invention is not, however, limited to optimising by reference to cost, but could be adapted to provide optimisation on the basis of other criteria. In addition, the invention is not limited in application to rehabilitation of existing networks but can be used to aid in the planning of a new network.

It is a further object of the present invention to provide an optimisation method which can be implemented by computer software either as an integral part of a network analysis tool (such as mentioned above) or as a discrete module which can be added to existing network analysis software to provide enhanced functionality.

According to a first aspect of the present invention there is provided a method of optimising a model of a pipe network with respect to a predetermined criteria, the method comprising modifying a starting proposal for a list of pipes within the network model which may be modified by performing the following operations:

i) selecting a first pipe from the pipe list which may be considered for modification;

ii) proposing a modification to the selected pipe which provides an incremental improvement in said criteria;

iii) performing a network analysis of at least one predetermined operating parameter of the network to predict whether a predefined operating limit of said operating parameter will be violated as a result of the modification;

iv) if said network analysis predicts a violation of said predefined operating limit, then rejecting the proposed modification and removing the respective pipe from consideration for any further modification;

v) selecting a next pipe from the pipe list which may be considered for modification and performing operations (ii) to (iv) on the selected pipe;

vi) repeating operation (v) until all pipes which may be considered for modification have been selected; and vii) repeating operations (i) and (vi) until no pipes of the pipe list remain to be considered for further modification.

According to a second aspect of the present invention there is provided a method of determining the hydraulic significance of each of a list of pipes within a model of a pipe network, the method comprising:

i) performing a network analysis on the network model to determine the flow patterns through the network at a given time;

ii) counting the number of instances of each pipe occurring in a flow path between a source node defined by the network model and the boundary of the network model, and using the instance count for each pipe as the indication of the hydraulic significance of that pipe within the network, such that pipes with a higher instance count are considered to more hydraulically significant than pipes with a lower instance count.

According to a third aspect of the present invention there is provided a method of determining peak flow rate demands on pipes within a model of a pipe network, the method comprising:
 a) totalling the peak flow for the whole network and distributing this across the network to give a network peak flow demand on each pipe;
 b) deriving a local peak flow demand representative of the localised demand on each pipe of the network; and
 c) combining the network peak flow demand with the local peak flow demand to arrive at a peak flow rate demand for each pipe in the network.

As will become apparent, the invention has a number of novel aspects which are combined in preferred embodiments but which can also be utilised independently.

Other preferred and advantageous features of the various aspects of the present invention will be evident from the following description.

Specific embodiments of the present invention will now be described, by way of example only, with reference to the accompanying drawings in which.

Figure 1:
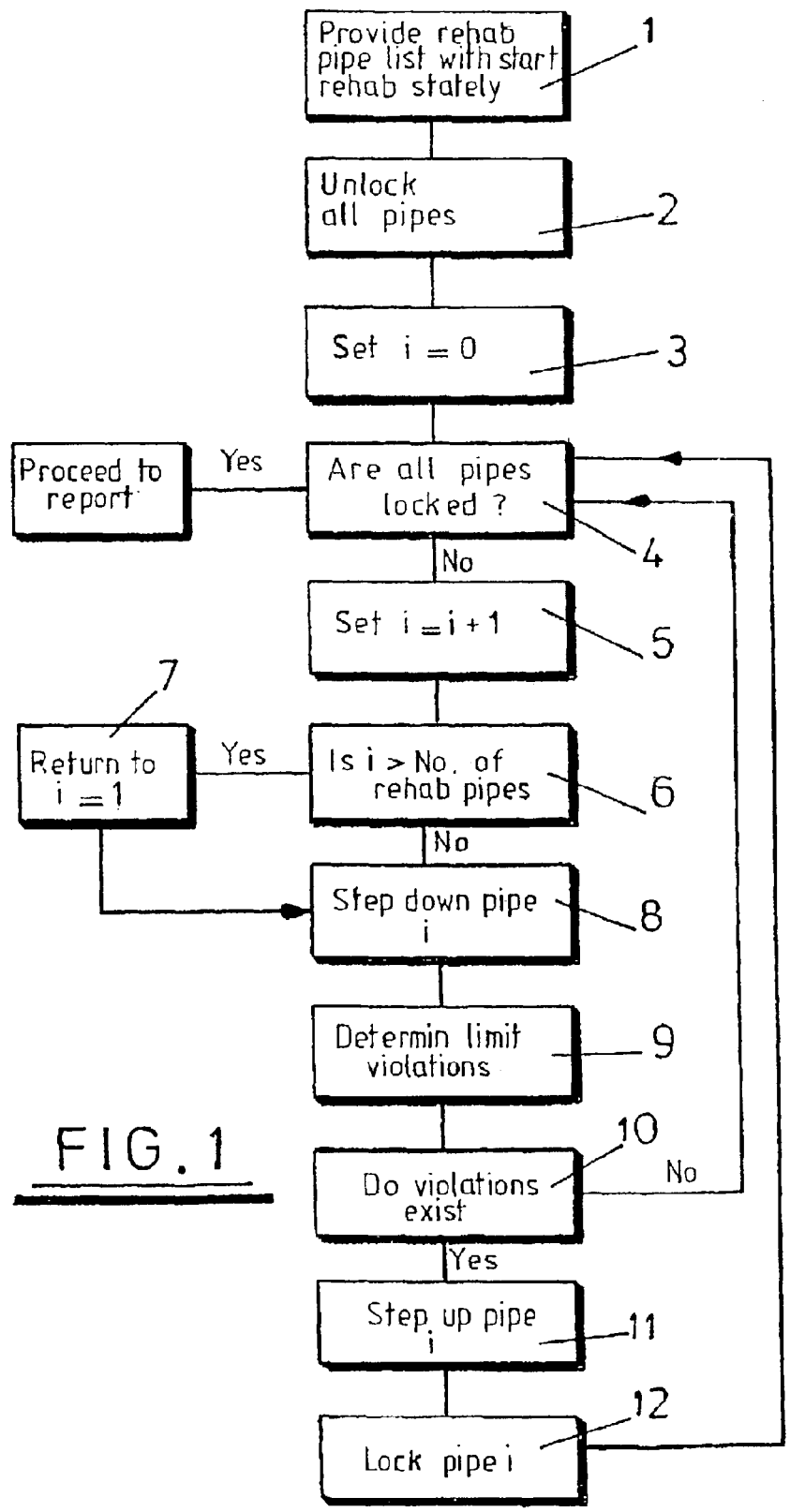
FIG. 1 is a flow diagram illustrating the steps of an iterative optimisation method according to the present invention.

By way of example an implementation of the present invention as a computer controlled process for determining a "least-cost" rehabilitation strategy for a water supply network will now be described. In this application the process requires for its operation a computer model of the network (or part of the network concerned) and other network analysis tools (including an hydraulic engine) necessary to perform calculations and predictions on the basis of the network model (network analysis). Since the present invention may be implemented as a discrete software module which can interface with proprietary network analysis software no detailed description of such features will be given here. Accordingly, it is to be understood that in a practical computer system for operating the present invention as described below, the rehabilitation method of the present invention will be one part of a system additionally comprising a computer model of the network under consideration, a hydraulic solving engine for performing hydraulic calculations and predicting the effect of changes to the network, and suitable interface and reporting facilities. The nature of the additional software analysis tools required will be readily apparent to the skilled reader by the references that are made to the required functionality. Such additional software tools may be entirely conventional and thus no description of appropriate tools will be made apart from references to the required functionality.

In addition, the invention requires reference to a contractor cost table in which the various rehabilitation options open to the planner, and associated costs, are listed. The concept of a contractor cost table is discussed above. For ease of interface with the present invention it will be appreciated that the cost table should be represented in a database from which information can readily be extracted. If the network planner does not have an appropriate database one can be constructed and indeed the system according to the present invention may incorporate a database into which relevant information can be input by the planner. As such, the system could guide the planner as to the information required.

From the appropriate cost table it would always be possible for the planner to determine the cheapest available option for rehabilitating selected pipes within the network. However, the user must also take account of a number of operating constraints which may not necessarily be satisfied by the cheapest rehabilitation strategy. The precise set of operating parameters which have minimum or maximum acceptable limits and which must therefore be considered in any particular instance may vary but some typical parameters are listed below (in no particular order).

A maximum acceptable hydraulic gradient will normally be specified. That is, there will be a maximum permissible head loss per unit length of pipe within the network to ensure demand can be met.

Minimum and maximum permissible pressures may be specified for each node, or selected nodes, within the network. For instance, it is often necessary to maintain particular nodes above a minimum pressure to avoid adverse effects on downstream pressures or flow rates and also meet levels of service criteria.

It may be necessary to limit the maximum pressure at various points in the network for instance to address leakage problems or to ensure that pipe pressure ratings are not exceeded.

Minimum and maximum flow rates through various parts of the network may be specified. For instance, it may be necessary to keep flow above a minimum rate to avoid sediment problems.

Minimum tank levels may be specified for reservoirs etc.

Conditions may be applied limiting the acceptable rehabilitation techniques which may be used in any particular instance and specifying a minimum or maximum permissible size for the pipe following rehabilitation.

It will be appreciated that the above list is not exhaustive and that a variety of conditions may apply in any particular case. The parameters and associated limits which must be considered may be defined by the network model, the network planner or may be default parameters provided by the system according to the invention (or indeed a combination of the two). The predefined limits of operating parameters which apply in any particular case are referred to generally hereinafter as "operating limits".

At the heart of the optimisation method of the present invention is an iterative routine which takes a "start" rehabilitation strategy for a number of pipes and modifies the strategy to produce an optimum "least cost" strategy (by reference to the appropriate user provided cost table) whilst ensuring that operating limits are not violated. Thus, as a preliminary step to the iterative routine a list of the pipes to be rehabilitated must be provided together with a suggested rehabilitation option for each pipe. The selected pipes incorporating the proposed rehabilitation (which may for instance be pipe lining or replacement ) are referred to hereinafter "rehab.pipes". Thus, for instance, where reference is made to the size of a rehab.pipe this is a reference to the size of the respective pipe as would result from the rehabilitation method currently proposed for that pipe. Thus reference to the size of the rehab.pipe may be reference to a reduced size following lining etc of the original pipe, or an increased size following replacement of the original pipe with a new larger pipe.

The planner may manually select the pipes to be rehabilitated from the network model, or use an appropriate filter (for instance selecting all cast iron pipes above a certain diameter), and may then select a "safe" strategy from the available rehabilitation options as the start strategy for the iterative routine. For instance, such a "safe" strategy may be to replace existing pipes with new pipes of similar size and flow characteristics, or a size larger than the existing pipes. Preferred methods for ordering the list of the pipes to be rehabilitated, and generating an appropriate start strategy for the iterative routine, will be described further below.

Once the pipe list and start strategy has been generated , the iterative routine according to the present invention may be operated as follows.

The first step is to select a first rehab.pipe from the pipe list.

Having selected the first rehab.pipe from the pipe list, the next step is to consult the appropriate cost table and "step down" the initially proposed rehabilitation method for the selected rehab.pipe. This is a step down in cost which can be determined from the appropriate cost table and will generally entail stepping down the size of the pipe to the next size down, but may also entail changing the material of the pipe or rehabilitation technique.

Once the selected pipe has been stepped down in cost, a network analysis is performed to determine whether or not any of the predefined operating limits are violated as a result of the change to the selected pipe. This part of the routine requires calling upon network analysis tools (such as an hydraulic engine etc) to perform the necessary calculations on the network (modified by the rehabilitation strategy including the stepped down rehab.pipe) which are then compared with the predefined limits. As mentioned above, the network analysis methods and tools which may be used to perform the calculations and make the necessary determination may be entirely conventional and thus will not be described here.

The above test can result in one of two outcomes: either that there are no operating limit violations or that there are operating violations. If there are no operating limit violations the iterative routine moves on to select the next rehab.pipe from the pipe list and repeats the process of stepping down the selected rehab.pipe and determining whether this results in any operating limit violations.

If, however, stepping down the currently selected rehab.pipe results in any operating limit violations, the selected pipe is stepped back up to its previously proposed rehab.pipe size etc and "locked" against further change. The routine then moves on to select the next rehab.pipe from the pipe list.

Once the iterative routine has completed its first iteration, and each rehab.pipe in the pipe list has been selected once, some rehab.pipes will have been stepped down whereas others will have been locked in their previous rehabilitation proposal (which after the first iteration will of course be the start proposal). The routine then returns to the start of the pipe list and selects the first un-locked rehab.pipe from the list. The selected pipe is then again stepped down and a determination is made as to whether or not any operating limit violations result. If there are no operating limit violations the routine moves on to the next unlocked pipe in the pipe list. If there are operating limit violations the selected pipe is stepped back up to its previous rehabilitation proposal and locked.

The routine is continuously iterated, making as many passes as necessary through the rehab.pipe list, until all pipes in the pipe list have been locked. This results in a rehabilitation strategy which meets the predefined operating requirements but which is cheaper to implement than the start strategy. This optimised strategy may then be reported as the "least cost" acceptable rehabilitation strategy.

The above is a simplified description of the basic operation of the iterative routine of the present invention which may be enhanced in a number of ways which will become apparent from the following description. It is important, however, to appreciate that the "least cost" option arrived at may not necessarily be the cheapest possible rehabilitation strategy if all possible strategies had been considered. For instance, changes to the initial starting strategy and order in which the rehab.pipes are considered during the iterative routine may result in different solutions (as mentioned above, preferred schemes for determining the ordering of the pipe list and start strategy will be described below). There may even be a number of alternative strategies which differ in detail but have substantially the same associated cost. However, the essence of the invention is the provision of a process which determines a low cost strategy at an acceptable overhead in terms of operating time and level of input required by the planner. The term "least cost" used above and hereinafter is to be interpreted accordingly.

It will be appreciated that there may be a number of ways in which the iterative routine can actually be implemented by computer software. No effort will be made here to describe in detail such an implementation as the design of an appropriate software program to run the process according to the present invention can be made by an appropriately skilled person. However, a simplified flow diagram illustrating an overview of one preferred way in which a computer program for running the iterative routine may be designed is shown in FIG. 1.

Referring to FIG. 1, block 1 represents the starting point of the routine which is the provision of a rehab pipe list in accordance with a start rehabilitation strategy. This is discussed in general terms above.

Block 2 ensures that all rehab.pipes in the pipe list are un-locked (the significance of which will be apparent from the above description of the iterative routine).

Block 3 sets the un-locked rehab.pipe count designated, i, to 0.

Block 4 determines whether all of the pipes in the rehab.pipe list are locked. If all the rehab.pipes are locked the program exits the iterative routine and proceeds to a reporting stage. If there are any unlocked pipes the process proceeds to block 5.

At block 5 the pipe count is moved on to the next un-locked pipe in the rehab.pipe list. On the first iterative this will be the first pipe in the pipe list.

At block 6 a determination is made as to whether or not the pipe count is greater than the number of rehab.pipes remaining un-locked. If the answer to this determination is yes, the routine moves to block 7 at which the first unlocked pipe in the pipe list is selected before moving on to block 8. If the answer to the determination made in block 6 is no, the routine moves straight on to block 8.

At block 8 the selected pipe i is stepped down as explained above by reference to the appropriate cost table.

At block 9 a network analysis is instigated to calculate the effect of stepping down pipe i on the predefined operational parameters of the network.

At block 10 a determination is made as to whether or not any of the predefined operating limits are violated (as a result of stepping down pipe i). There are two possible outcomes. If the answer to this determination is no the routine returns to block 4. If the answer is yes the routine moves on to block 11.

At block 11 the selected pipe i is stepped back up to its previous rehabilitation condition, i.e. returned to the condition it was in prior to being stepped down at block 8.

At block 12 pipe i (having been stepped up at block 11) is locked against further modification. The routine then returns to block 4.

The program cycles through the iteration routine until the determination at block 4 finds that all pipes have been locked in a final rehabilitation strategy which is then passed on to a reporting routine, via any further analysis that may be deemed desirable (a preferred analysis is described further below).

As mentioned above, the order in which the iterative routine passes through the list of pipes to be rehabilitated may have a bearing on the optimised rehabilitation strategy arrived at by the routine. In a preferred embodiment of the present invention the pipe ordering is a reverse of the hydraulic significance of each pipe. In other words, the least hydraulically significant pipes are considered before the most hydraulically significant pipes.

There may be various different methods for determining the hydraulic significance of an individual pipe within the list of pipes to be rehabilitated. For instance, it would be possible to estimate the hydraulic significance of rehab.pipes on the basis of the size of the original pipes. However, the actual hydraulic significance of a pipe within a network may not be directly related to its size and one aspect of the present invention is to provide a novel method for determining the hydraulic significance of pipes in a network. This will now be described with reference to the flow chart of FIG. 2 which sets out the steps to be implemented by an appropriately designed computer program.

The determination of the hydraulic significance in accordance with the present invention is essentially a flow path analysis performed on the network model determining how many times each pipe occurs in flow paths between the source node and boundaries of the network (or DMA etc). Thus, the routine for determining the hydraulic significance of the selected pipes must be made by reference to an appropriate network model which has the necessary information. Because water supply and/or distribution systems are dynamic and water demand patterns vary over time, a typical network model will comprise a number of "snap shots" of the flow conditions at various time intervals over a given time period. For instance, the direction of water flow through some pipe elements may change over a 24 hour period as demand patterns change.

Figure 2:
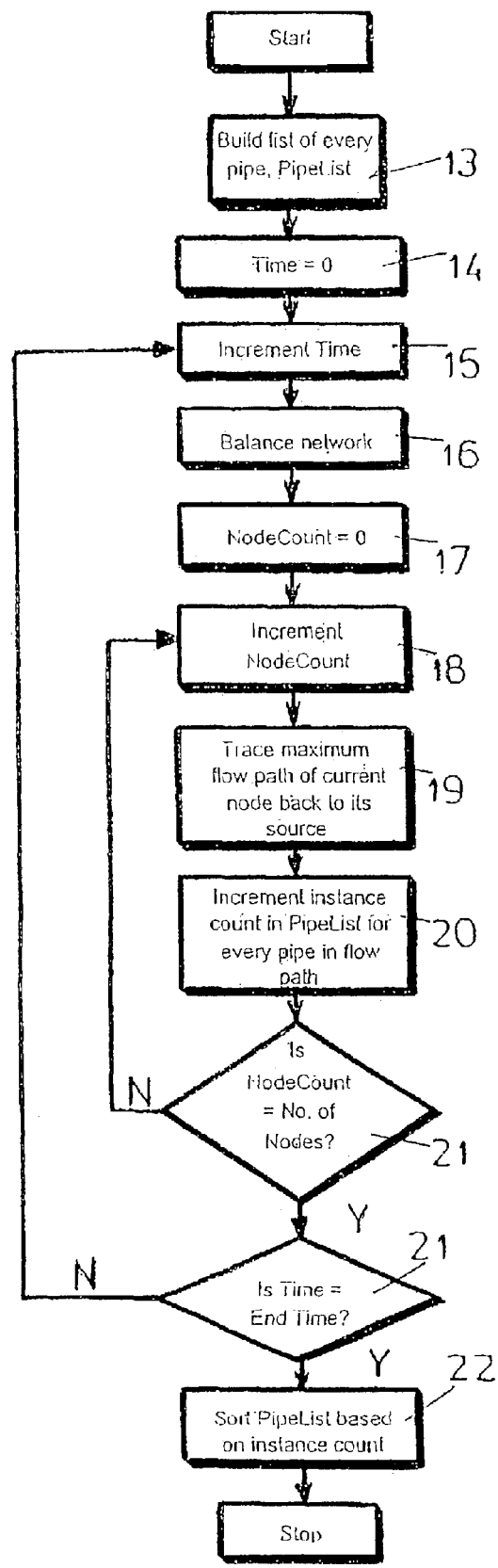
FIG. 2 is a flow diagram illustrating the steps of a method for determining the hydraulic significance of pipes within a pipe network in accordance with the present invention.

Referring to FIG. 2, the first step in the procedure, as represented by block 13, is to build a pipe list. This may either be a list of every pipe within the network (or the portion of the network (DMA etc) under consideration) or only of those pipes selected for rehabilitation. The latter would streamline the process. At this stage, the pipes may be listed in any order.

The preferred routine for determining the hydraulic significance of pipes illustrated in FIG. 2 considers the network flow at 30 minute intervals throughout a 24 hour period, although it will be appreciated that other time intervals/periods could be selected. Thus, at block 14 time is set to 0 and is an advanced to the first time interval at block 15.

At block 16 the network model must be balanced. In other words, the hydraulic engine must determine the flow patterns through the network at the selected time interval. This is a conventional operation and is a basic facility provided by conventional network analysis tools.

At block 17 the node count is set to 0. As mentioned above, the network nodes are identified by the network model.

At block 18 the node count is incremented to the next node. The order in which the nodes are considered is not important.

At block 19 the program operates to trace the flow path from the selected node back to the source. There may be a number of different flow paths between the selected node and the source.

At block 20 an increment is made in an instance count for each pipe in the pipe list which appears in a flow path from the currently selected node to the source (for further details see the description of FIG. 3 given below).

At block 21 a determination is made as to whether or not the node count equals the number of nodes in the network (or DMA etc) under consideration. If the answer is no the program returns to block 18 and the node count is incremented to the next node following which the steps of blocks 19 to 21 are repeated. If the answer is yes the routine proceeds to block 21.

At block 21 a determination is made as to whether or not the time interval under consideration equals the end time. That is, whether or not every time interval over the total time period has been selected. If the answer is no the routine returns to block 15 and the time is incremented to the next time interval. The routine of blocks 15 to 21 is then repeated until the time equals the end time and the routine passes on to block 22.

At block 22 the pipe list is sorted and ranked on the basis of the instance count for each pipe. Pipes with the highest instance count are considered to be the most hydraulically significant. The result is that each selected pipe is ordered in accordance with its hydraulic significance and this order can be used for the iterative routine described above.

Figures 3A, 3B:
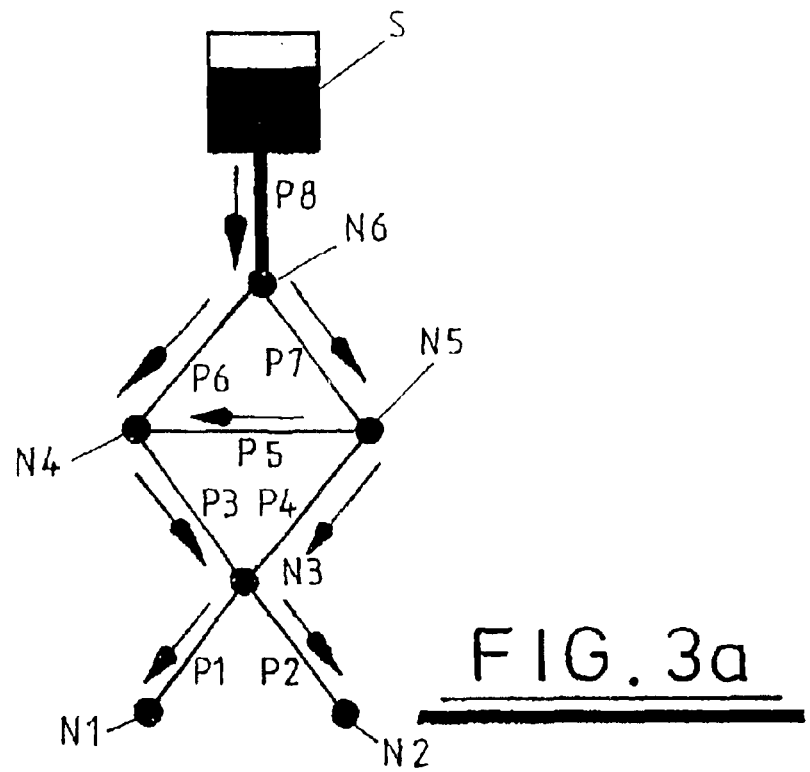
FIG. 3a is a schematic illustration of a simple pipe network.
FIG. 3b is a table presenting the results of an hydraulic significance determination made in accordance with the method of FIG. 2.

A simple example illustrating the manner in which the instance count is made is shown in FIGS. 3a and 3b.

FIG. 3a is a schematic diagram of a simple pipe network and FIG. 3b is a table illustrating incrementation of the pipe count for each pipe in the network to arrive at a figure representative of each pipe's hydraulic significance. Referring firstly to FIG. 3a, the illustrated network comprises a source S, eight pipes P1–P8, and six network nodes, N1–N6 respectively. In accordance with the routine described above, each node is considered in turn and the flow paths to that node via the pipe or pipes terminated or converging at that node are traced having regard to the flow directions determined by the network analysis performed to balance the network (as mentioned above). Flow directions are indicated in FIG. 3a by arrows associated with each pipe. Each pipe converging at the selected node is considered in turn and every flow path from the source to that pipe is traced. Any pipe occurring at least once in one or more of the flow paths to the pipe under consideration receives an instance count of 1.

Thus, for instance, node N1 is fed directly by a single pipe P1. There are however three separate flow paths to node N1 via pipe P1, namely: P8/P6/P3/P1; P8/P7/P5/P3/P1; and P8/P7/P4/P1. Thus, when considering pipe P1 all pipes in the network baring pipe 2 receive an instance count of 1.

Taking now node N3 for example, this is fed directly by two separate pipes, P3 and P4, each of which must be considered separately. There are two separate flow paths to node N3 via pipe P3, namely P8/P6/P3 and P8/P7/P5/P3. Thus when considering pipe P3 each of pipes P3, P5, P6, P7 and P8 receive an instance count of 1. When considering pipe P4 on the other hand, which also converges at node N3, there is a single flow path P8/P7/P4. Thus when considering pipe P4 only pipes P4, P7 and P8 receive an instance count.

This operation is repeated for every node in the network, considering separately flow paths that either converge or terminate at the selected node via each pipe that converges or terminates directly at that node. The result of this operation is summarised in table 3b. The rows indicate the pipes which appear in a flow path to the respective fed pipe P1–P8. The columns are the cumulative instance counts for each of supplying pipes P1–P8. The final row at the bottom of the table is the hydraulic significance (HS) of each pipe by reference to the total of its instance counts. As would be expected, pipe element P8 clearly has the greatest hydraulic significance as all other pipes in the network must be fed from this pipe. Similarly, terminal pipes P1 and P2 are clearly the least significant. The existence of pipe element P5 however has an effect on the relative significance of other pipes in the network so that, for instance, element P7 has a greater hydraulic significance than element P6.

It will be appreciated that although it is convenient to make the count by considering each node in turn, the same result would be achieved if each pipe was considered in a random order since the count is cumulative. That is, whatever order pipes P1–P8 are considered (as fed pipes), the supplying pipes would be the same and thus the calculated hydraulic significance would be unchanged.

The hydraulic significance count represented by FIGS. 3a and 3b represents the process made at a given time. As mentioned above, the flow directions through the network can change over a period of time. For instance, should the flow direction through pipe element 5 reverse, the hydraulic significance of pipes 6 and 7 under that particular flow condition would also reverse. Thus to obtain a more representative indication of hydraulic significance the same process is repeated for each time period under consideration.

Accordingly, the overall hydraulic significance for each pipe is taken as the sum of the counts made at each of the time intervals considered (in the example set out above this is every 30 mins over a 24 hour period). Thus, if at most times during the day flow through the pipe element P5 is in the direction shown, the total hydraulic significance count of pipe element P7 would be greater than for pipe P6.

The overall result is that a hydraulic significance is attached to each pipe within the pipe list which can then be ordered accordingly. This ordering can be used to determine the order in which pipe elements are considered by the iterative routine of FIG. 1. Specifically, the invention has been found to give good results when the pipes are considered by the iterative routine in an order which is the reverse of the relative hydraulic significance of the pipe elements.

As mentioned above, the iteration routine of FIG. 1 must take as its starting point a start rehabilitation strategy. The start strategy selected may have a bearing on the final outcome although it is expected that, whatever the starting strategy, the iterative routine will provide a good solution. Nevertheless, a preferred scheme for settling on a start strategy for the iterative routine will now be described.

Before the process is run, the pipes to be rehabilitated must be selected by the network planner, i.e. a pipe list must be constructed as mentioned above. The network planner can then determine the least expensive option for rehabilitating each pipe by reference to an appropriate cost table. Once the least expensive option has been selected, a determination may be made as to whether any of the predefined operating limits are violated by the strategy proposed. If the answer is no, then this least expensive option may be taken as the solution and there is no need to run the iterative routine at all. Such a solution can be considered as a lower bound solution and is not likely to occur very often.

If the initially proposed cheapest rehabilitation strategy does not meet the predefined conditions, i.e. there are operating limit violations, the present invention proposes a scheme for modifying the initial strategy to produce a start strategy for the iterative routine. Since the iterative routine will generally improve upon whatever start strategy is selected, the present invention contemplates a routine which represents a pragmatic approach to the selection of a start strategy. If the initial least cost option causes operating limit violations it will be necessary to increase the size of at least some of the rehab.pipes. In accordance with the preferred method of the present invention, this is done by again referring to the hydraulic significance of the selected pipes (preferably determined in accordance with the method described above). All the rehab.pipes are then increased in size but not all rehab.pipes are increased by the same amount. The amount by which each rehab.pipe or group of pipes is increased in size is determined by relation to the hydraulic significance of that rehab.pipe or group of pipes. Specifically, the invention proposes taking a select group of the most hydraulically significant rehab.pipes and increasing the size of these pipes by three sizes larger than that proposed in the initial solution and then increasing the size of the remaining pipes to one size larger than that proposed in the initial solution. The selection of the "most significant" pipes can be made on a number of bases, for instance this could be the top few percent of pipes in the list, the top specified number of pipes in the hydraulic significance order, or pipes with a hydraulic significance above a lower limit.

Whatever the method used to group pipes from the hydraulic significance order, the principle of the invention is to provide a simple approach which whilst being pragmatic has some reference to the relative importance of pipes in the network and thus the effect that changes of sizes of particular pipes or groups of pipes in the network may have on the network as a whole.

Once the proposed rehab.sizes have been increased in accordance with the above scheme to produce a modified rehabilitation strategy, a second determination is made as to whether any of the operating limits are violated. If the answer is no, then the modified strategy is used as the start strategy for the iterative routine. If the answer is yes, i.e. some limits are violated, a further modification needs to be made. At this stage there is no point in effectively duplicating the work that would be done by the iterative routine and so the preferred step according to the present invention is to set all pipes to be rehabilitated to their maximum size and once more tested for operating limit violations. Hence it will be seen that this step of the preferred strategy for starting the optimisation process is to test out the suitability of an upper bound solution based on adoption of maximum possible rehab.pipe sizes throughout the scheme.

For many cases the adoption of the maximum rehab.pipe sizes as a starting strategy will not produce operating limit violations and can therefore be used as the starting strategy for the iterative routine. However, if this proposed start strategy does result in operating limit violations (the large increases in mains rehab.pipe capacities leads to operating violations that arise as a result of the very low velocities and slack hydraulic gradients associated with the maximum rehab.pipe size option), then it is necessary to test one further set of starting conditions. The approach taken by the present invention is to test the existing network for operating limit violations. If these do not exist, then the final starting strategy option is to set all the rehab.pipes one size larger than the existing pipe sizes. However, if operating limit violations do exist for the existing network then the starting strategy option is, once again, to set all rehab pipes to the maximum possible size offered as an option from the associated contractor cost charts. This final modified strategy is then used as the start strategy for the iterative routine. It has also been found that the iterative solution finding stage of the current invention can be significantly shortened if a step is taken that presupposes that all the existing ferrous mains to be rehabilitated already exhibit hydraulic frictions normally associated with the much smoother plastic mains used for rehabilitation).

As mentioned above, one of the important operating limits which will usually be specified for a network is that each rehab.pipe within the network is capable of meeting peak flow demands without unacceptable pressure losses per unit length of pipe, i.e. without the hydraulic gradient increasing above a predefined maximum limit. Conventional water supply network analysis will provide estimates of the flow rate expected through each pipe in the network. This conventional "network analysis flow" can be used in determination of the limit violations. However, in accordance with a further aspect of the present invention there is provided a method of determining the peak flow requirement of each pipe in a pipe network which improves upon the results obtained by conventional network analysis by taking into account variations in the local water supply demand across the network and the effect that this may have on the total demand placed on individual pipes within the network.

For instance, conventional network analysis will assume that at peak flow time the flow effectively increases by the same proportion throughout the network. This, however, is unlikely to be the case. It may well be that the peak flow condition is due to a sudden local demand in one particular area of the network where, for instance, industrial units or farmers etc. are supplied. However, it is more usual for local peak demand flow, such as that which might occur in a cul-de-sac, to be generated from such local domestic demands all taking place at the same time. The effect of the application on conventional network analysis would be to smooth the peak flow out across the network which may give an inaccurately low estimate of the peak flow expected at some points of the network. To avoid the potential problem of undersizing rehab.pipes from such incorrect water demand modelling, the present invention provides a method of estimating peak flow which combines both an estimate of local demand determined in a novel way together with peak flow through the network calculated by conventional network analysis processes (which will be referred to hereinafter as "network analysis peak flow").

In accordance with the present invention, the local demand flow is calculated on the basis of flow procedures similar to those normally applied to determine flow rates to service pipes on a spur of a pipe network, but applied across the network as a whole. To do this, the invention introduces the concept of "pseudo-spurs". The preferred way for separating the network into pseudo-spurs is to first identify each source or pseudo source within the network and also each node which receives convergent inflows from two or more pipes of the network. Each of the nodes/sources identified in this way is then considered to be the origin of one or more downstream pseudo-spurs. Where two or more pseudo-spurs have a common origin, they may collectively be viewed as a "pipe tree". The pseudo-spurs (which are effectively branches of a pipe-tree) and pipe-trees are identified by reference to the network analysis flow patterns (i.e. flow directions) through the various pipe elements of the network. To determine local demands at the peak flow condition, this is done by reference to the network analysis peak flow pattern.

An estimate of the local demand which must be met by each pseudo-spur is then calculated, and the local demand flow of each pipe in each pseudo-spur is added to a throughflow component determined on the basis of the network analysis peak flow to give a sum which is taken to be the peak flow which must be met by each individual pipe. Individual pseudo-spurs beginning at a given origin terminate at a downstream convergent node, or at a terminal demand node. The manner in which the network is divided into pseudo-spurs leads to an effective weighting of the effect of local demand versus network analysis throughflow.

The network analysis flow component of the resultant peak flow determined can be calculated by any conventional network analysis technique. No particular technique will therefore be described for calculating the network analysis flow. The preferred manner in which the local demand is accounted for by the present invention will now be described with reference to FIGS. 4a and 4b which reproduce the simple network of FIG. 3.

Figure 4B:
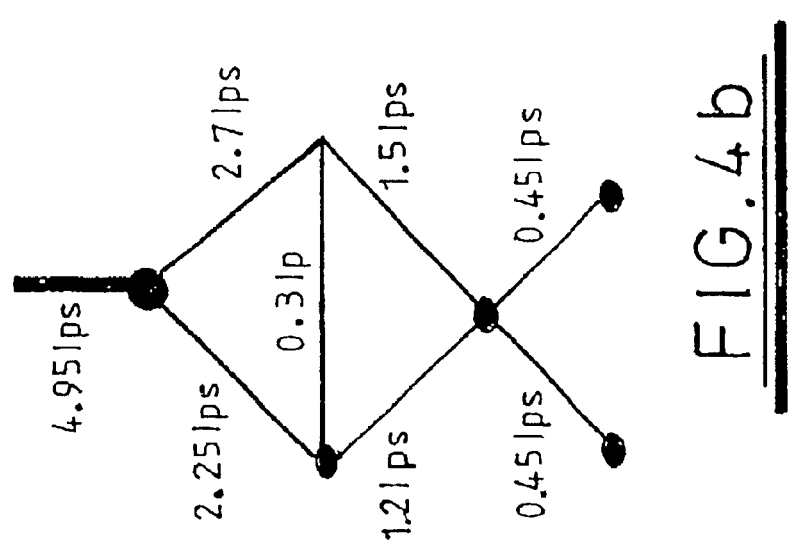
FIGS. 4a and 4b are further schematic illustrations of the simple pipe network of FIG. 3a used to illustrate a method of performing a peak flow analysis in accordance with the present invention.
Figure 4A:
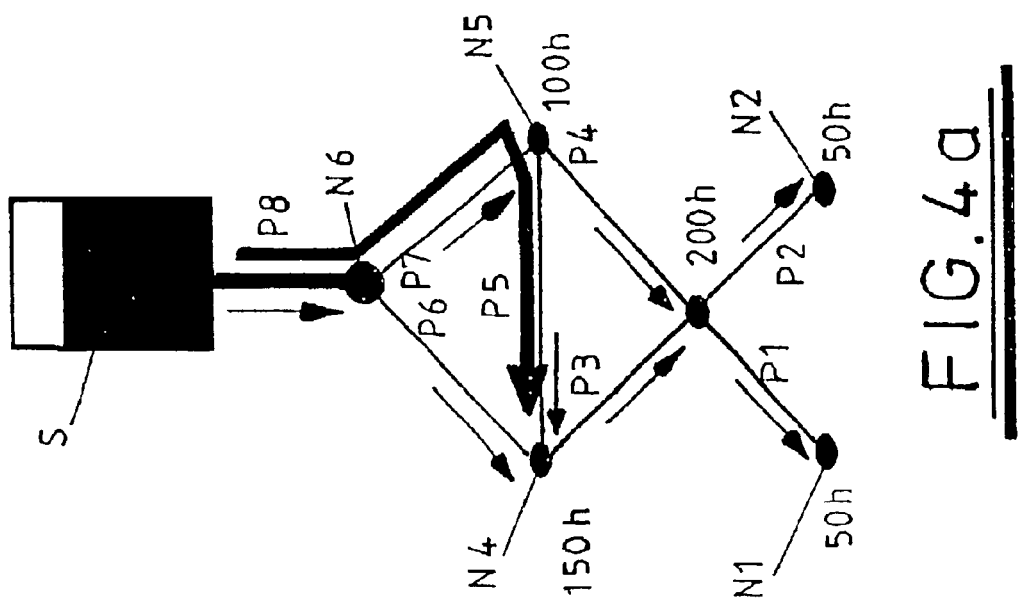

Referring to FIG. 4a, an indication is given at each node as to the properties supplied directly from service pipes (not shown) leading from the respective node. For simplification, the network is considered to be supplying domestic properties only, i.e. 50 houses are supplied by each of nodes N1 and N2, 200 houses are supplied by node N3, 150 houses are supplied by node N4 and 100 houses are supplied by node N5. There is no local demand at node N6.

In accordance with the first stage of the process, the sources and convergent nodes are identified. The concept of sources and pseudo-soruces is discussed above and will be familiar to the skilled reader. A convergent node is a pipe junction at which flow converges from two or more separate pipes. It will be appreciated that any particular node may be a convergent node at some parts of the day but not at others. Since the object here is to determine peak flow demands, the convergent nodes are identified by reference to the network analysis peaks flow pattern. In this case (assuming the flow pattern illustrated to be the peak flow pattern as determined by network analysis) there is a single source S and two convergent nodes, i.e. nodes N3 and N4. A determination is then made of the pseudo-spurs originating at each of the convergent nodes and the source.

Thus, the pipe tree which has its origin at the source S comprises three separate pseudo-spurs. A first pseudo-spur comprises pipes P8 and P6 and terminates at downstream conversion node N4. A second pseudo-spur comprises pipes P8, P7 and P5 and again terminates at downstream convergent node N4. The third pseudo-spur comprises pipe elements P8, P7 and P4 and terminates at downstream convergent node N3.

Considering convergent node N4, the pipe tree which has its origin at this node comprises only a single pseudo-spur which terminates at downstream convergent node N3 and comprises the single pipe P3.

Considering now convergent node N3, the pipe tree which has its origin at this node comprises two pseudo-spurs each of which consists of a single pipe P1 and P2 respectively.

Thus, in the network as a whole there are three pipe trees and six pseudo-spurs. It will be seen that some pipes, namely pipes P7 and P8, occur in more than one pseudo-spur.

Having first identified the pseudo-spurs, the next stage is to consider the number of users (in this case houses) supplied by each pipe to determine a local demand loading for each pipe. An assumption is made that the local domestic demand (houses) at a convergent node is supplied equally from the converging pipes. Thus, to arrive at the local demand weighting for any particular pipe the part that pipe plays in supplying downstream properties supplied by all pseudo-spurs of which that pipe is an element must be considered.

Thus, taking pipe P1, this occurs in only a single pseudo-spur and moreover is the only pipe in that particular pseudo-spur. Thus, the local loading of pipe P1 is the 50 houses located at node N1. A similar calculation applies to pipe P2, which also has a local loading of 50 houses.

At node N3, it is assumed that the 200 houses supplied from that node are supplied from each of the pipe elements converging at that node, i.e. pipes P3 and P4. Moreover, an assumption is made that each of the pipes P3 and P4 makes an equal contribution to the demand at node N3. Thus, the local demand loading for pipes P3 and P4 is 100 houses in each case.

Similarly, of the 150 houses supplied at node N4, 75 are assumed to be supplied from pipe element P5 and 75 are assumed to be supplied from pipe element P6. Pipe P6 is part of a single pseudo-spur P8/P6 which has its origin at source S and its termination at convergent node N4. Therefore, the local loading applied to pipe element P6 comprises the 75 houses supplied at node N4.

Taking now pipe element P7, this is part of two pseudo-spurs both of which have their origin at the source S but which have different terminations. The first of these is pseudo-spur P8/P7/P5 which terminates at node N4. The second is P8/P7/P4 which terminates at node N3. The total local loading applied to pipe P7 is considered to comprise a contribution from its function in both of these pseudo-spurs. Thus, pipe P7 is considered to supply all 100 houses at node N5, 75 of the houses at node N4 (via pipe P5), and 100 of the houses at node N3 (via pipe P4), giving a total loading for pipe P7 of 275 houses.

It will therefore be seen that whereas every pipe within the network will have a direct local demand, i.e. the properties deemed to be supplied by that pipe at the node at which it terminates, some will also have an indirect local demand arising from each of the downstream pipes within the same pipe tree. Thus, the total local demand loading for pipe element P7 may be arrived at by summing the direct local demand loadings of pipe P7 with that of each of the downstream pipes in the same pipe tree, i.e. pipes P4 and P5 which have direct loadings of 100 and 75 houses respectively. This gives the total of 275 house for pipe P7.

Finally, pipe P8 is part of three different pseudo-spurs all having their origin at source S. Two of these terminate at node N4, namely pseudo-spur P8/P6 and pseudospur P8/P7/P5. The third is pseudo-spur P8/P7/P4 which converges at node N3. The total loading for pipe P8 comprises a contribution from its function in each of its pseudo-spurs. Again, the total local loading for pipe P8 can be arrived at by summing the direct local loading of pipe P8 with the direct local loadings for each of the pipes downstream of pipe P8 within the same pipe tree (which will of course be all pipes downstream of pipe P8 within each pseudo-spur of which pipe P8 is an element). In other words, the total local loading for pipe P8 is the sum of the direct local loading for pipe P8 (which is 0), the direct local loading for pipe P7 (which is 100 houses), the direct local loading for pipe P5 (which is 75 houses), the direct local loading for pipe P6 (which is 75 houses) and the direct local loading for pipe P4 (which is 100 houses), which gives a total of 350 houses.

An alternative way of arriving at the total local loading for pipe P8 is simply to sum the total local loadings for each of the pipes immediately downstream of pipe P8 within the same pipe tree. In other words totalling the previously calculated total local loadings of pipes P6 and P7. This same method can be applied throughout the network.

Once the total local demand loading at the peak flow condition has been determined for each pipe within the network, the associated local demand must be determined. This may be done by estimating the local demand per house and then calculating the local demand for each pipe (as a simple multiple of the total local loading for that pipe and the estimated local demand per house). Alternatively an appropriate formula may be applied to the total house loading for each pipe.

Local demand conditions are conventionally determined by an empirical formula. For instance, one such formula provided by the Foundation for Water Research applicable to domestic properties is as follows:

$F = kN^A$

F=flow, liters per second k=a constant, based on the type of property

N=number of houses $^A$=a power term, taken to be 0.78

In this simple empirical formula, houses are categorised as one of two types each having a different value for k (0.067 and 0.107 respectively). This formula then provides an estimate of the local demand at different locations across a network by applying the formula to the two groups of properties. Applying the above formula to, for instance, pipe P7, and assuming in this example that 75% of the houses are type 1 and the others type 2, gives a total local demand flow for pipe P7 of 6.16 liters per second.

This local demand flow calculation takes no account of the contribution any particular pipe may make to the water supplied downstream of the respective pipe tree. Thus, the next step is to calculate a throughflow component of the peak pipe flow for each pipe in the network. This is done by estimating the flow to be provided to the network downstream of the pipe tree on the basis of the conventional network analysis flow rates by determining the contribution made to the network downstream of each pseudo-spur containing the pipe in question. In other words, the throughflow for each pseudo-spur is determined and the throughflows for each individual pipe is taken to be the sum of the throughflow through each of the pipe spurs including that pipe.

As mentioned above, the flow figures for the through flow calculation may be taken from a conventional network analysis, i.e. may be conventional network analysis peak flows. FIG. 4b shows the results of such a conventional network analysis on the basis of a normal (house) demand flow of 0.0045 liters per second and a peaking factor of 2. Thus, for the 550 houses supplied by the network this gives a total peak demand of 4.95 liters per second. The network analysis then apportions this to each pipe element in accordance with conventional methods and the relevant flows are listed. Thus, using conventional network analysis the peak flow through pipe element P7, for example, would be assumed to be 2.7 liters per second.

Taking pipe P7 as an example, to determine the through flow to be added to the local demand flow calculated above, all pseudo-spurs containing pipe P7 must first be identified. These are spurs P8/P7/P5 and P8/P7/P4. Having identified the relevant pseudo-spurs, the through flow for each spur must be determined. This is done by reference to the network analysis flow immediately downstream of the node at which the respective pseudo-spur terminates.

Consider first pseudo-spur P8/P7/P5 which terminates at node N4. Only a single pipe is immediately downstream of node N4, i.e. pipe P3. Pseudo-spur P8/P7/P5 does not however provide all the flow for pipe P3 since pseudo-spur P8/P6 also terminates at node N4. Thus, the contribution made by pseudo-spur P8/P7/P5 to the network analysis flow through pipe P3 is taken as the ratio of the flow through the downstream pipe of the spur, i.e. pipe P5, to the total network flow converging at node N4. Thus, the through flow through pseudo-spur P8/P7/P5 is determined by the calculation:

$$[q_{p5}/(q_{p6}+q_{p5})] \times q_{p3}$$

where qn is the network analysis flow in pipe n

*which gives* $[0.3/(2.25+0.3)] \times 1.2 = 0.14$ liters per second

Applying the same process to pseudo-spur P8/P7/P4, the calculation is $[1.5/(1.5+1.2)] \times (0.45+0.45)$, which gives 0.5 liters per second.

The total through flow for pipe P7 is then the sum of the through flows through each of the pseudo-spurs P8/P7/P5 and P8/P7/P4, i.e. 0.14+0.5 liters per second, which gives 0.64 liters per second. The total peak design flow demand for pipe P7 is then the sum of the through flow component and the local demand component calculated above, i.e. 0.64+ 6.16 liters per second, giving a total of 6.8 liters per second. Thus, it can be seen that the peak design flow calculated in accordance with the present invention, which takes account of local demand, is much higher than the network analysis peak flow for pipe P7 of 2.7 liters per second.

The same process can be applied to each pipe within the network. It is convenient to consider each pipe tree in turn, since any given pipe will occur in only one pipe tree. Once this process has been applied across the whole network it will be seen that at the extremities of the network, where network analysis throughflows have relatively low or null values, the local demand component of the peak flow calculated in accordance with the present invention will be more significant than for upstream mains pipes etc nearer the source which by their nature have higher network throughflows.

It will be appreciated that the manner in which the network flows are calculated is not of primary significance. It will also be appreciated the local demand formula used above is only an example of a simple formula. The significant feature of this aspect of the invention is that whatever flow is calculated by the conventional network analysis is supplemented by a local demand loading calculated in accordance with the above procedure by breaking the network as a whole up into pipe trees comprising pseudo-spurs. Furthermore, whereas the proposal laid out above is one particularly efficient way of splitting the network into individual pipe spurs, other alternatives might be envisaged.

It will be appreciated that the calculations made above are highly dependent on the pattern of flow through the network and thus to determine the peak flows the network flow pattern at the peak flow time is taken. However, it is also possible that local areas within the network may experience a localised peak which does not coincide with the peak for the network as a whole. Thus, as an enhancement to the basic method it would be possible to perform the above calculation for a number of different times over a given period (say, 30 min intervals over a twenty four hour period) and the maximum value obtained for any particular pipe from any of the times taken as the peak flow through that pipe.

Figure 5:
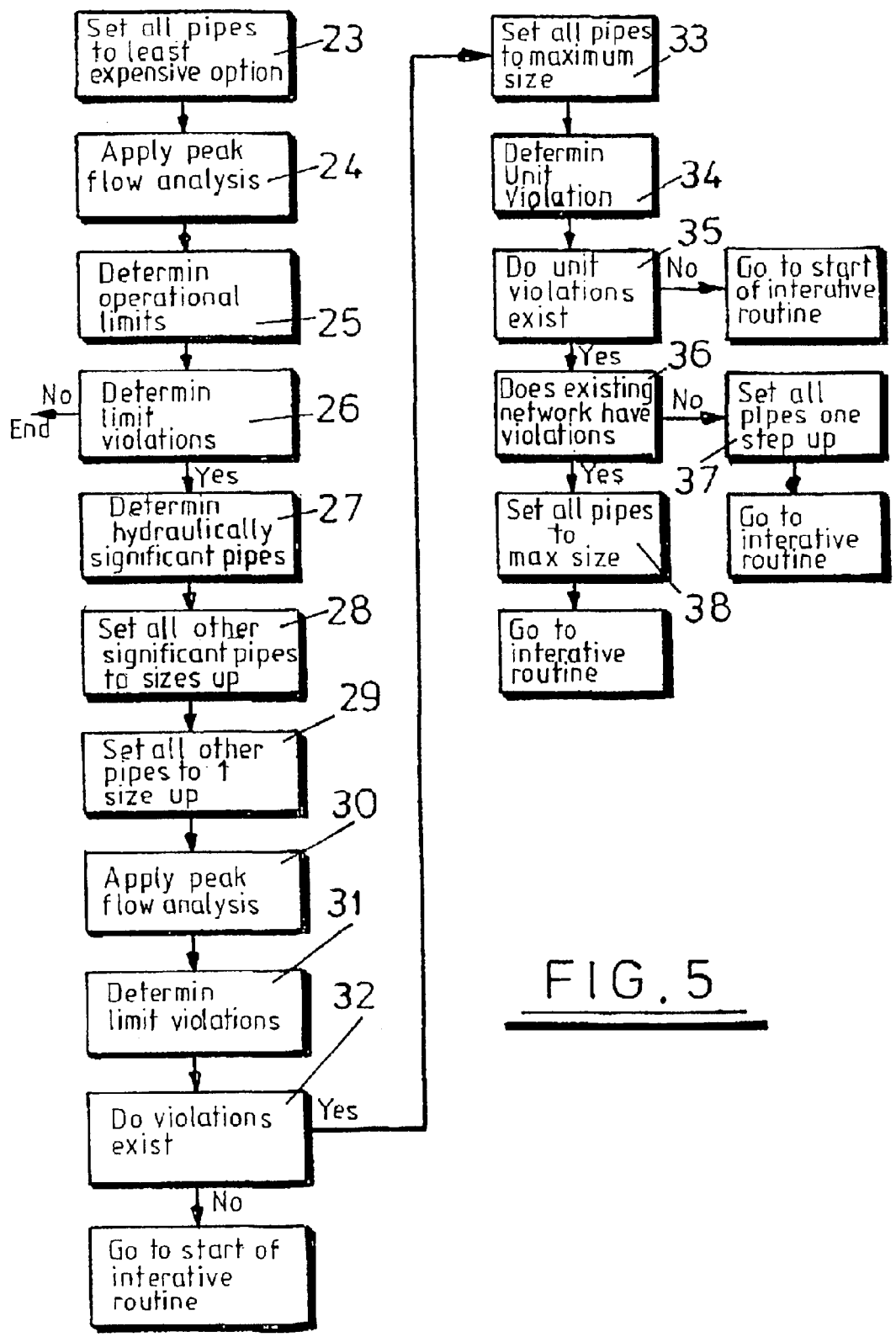
FIG. 5 is a flow diagram illustrating the steps of a method for deriving a start strategy for the iterative method illustrated in FIG. 1.

FIG. 5 is a flow diagram illustrating how determination of peak flow requirements in accordance with the above outlined procedure can be incorporated in a preferred routine for establishing a start rehabilitation strategy for the iterative routine of FIG. 1. Thus, referring to FIG. 5, block 23 represents the initial stage of selecting the least expensive rehabilitation option for all pipes selected for rehabilitation. This will be done by the network planner as mentioned above.

Rather than advancing immediately to a determination of whether any operating limits are violated, the next stage at block 24 is to apply the peak flow analysis described above. If any proposed rehab pipe is found to be of an insufficient diameter etc to provide the calculated peak flow at the maximum acceptable hydraulic gradient (typically 1:100) the rehab proposal is automatically adjusted by upsizing the rehab.pipe in question to the minimum required size to accommodate the peak flow (or by changing the material of the pipe to a material which provides higher flow rates).

Once any adjustments have been made in accordance with the peak flow analysis the process passes to block 25 at which the operating parameters are determined. This is done in the same way as described above in relation to the iterative routine.

At block 26 a determination is made as to whether any of the operating limits are violated. If the answer is no then the least expensive option suggested by the user, modified as necessary by application of the peak flow analysis, can be taken as the final rehabilitation strategy. If the answer is yes as is almost certainly going to be the case in most applications, the process moves on to block 27.

At block 27 the routine of FIGS. 3a and 3b described above is performed to determine the hydraulic significance of the pipes which are then ordered accordingly. This block can be omitted if the determination of hydraulic significance has been performed as a preliminary step to the start of this procedure.

At block 28 a selection of the most hydraulically significant pipes are set to three size larger than initially proposed in the least expensive strategy. The selection of the most hydraulically significant pipes can be made on a number of basis as mentioned above. Making the pipes three sizes larger is to some extent arbitrary adjustment but one which has been found to provide satisfactory results.

At block 29 all those pipes not increased in size to three sizes larger are increased in size to one size larger than the initially proposed least expensive option.

At block 30 the peak flow analysis is applied once more. The peak flow analysis is provided at this stage in the routine on the assumption of resizing of pipes in blocks 28 and 29 such that hydraulically significant pipes are three times larger than the minimum rehab.pipes and all other rehab-.pipes are one size larger than the smallest rehab.pipe option. The reason for doing this is that increasing the size of some pipes may mean that the flow pattern for the network is affected so that other pipes no longer need to have as large a minimum size as previously required when the peak flow analysis was conducted at block 24. It will be appreciated that each time the peak flow analysis is performed there must first be a conventional network analysis of the flow through the network based on the modified pipe sizes.

Once the peak flow analysis has been performed, and the minimum size of any pipes adjusted accordingly, a further determination of operating limit violations is made at blocks 31 and 32. If there are no violations, the strategy as modified by the above routine is taken as the start strategy for the iterative routine of FIG. 1. If operating limit violations do exist further modification of the strategy is required before the iterative routine can begin. Thus the procedure passes on to block 33 at which all rehab.pipes are set to their maximum possible sizes in the network. A further limit violation assessment is made at blocks 34 and 35 and if no limit violations exist this strategy is used as the start strategy for the iterative routine.

If operating limit violations still exist a further test is conducted at block 36 to determine whether or not the original network had operating limit violations. If it did not, the procedure passes on to block 37 at which all rehab.pipes are set to one size larger than the original size. This is then used as the start strategy. If, on the other hand, the original network did have operating limit violations the procedure moves on to block 38 at which all rehab.pipes are set to the maximum possible rehabilitation size available. This then is used as the start strategy for the iterative routine.

The iterative routine has been described above at some length in relation to FIG. 1. It will be appreciated that an early step in the procedure is to unlock all of the pipes (i.e. block 2 of FIG. 1). This will include unlocking any pipes which have been resized by application of peak flow analysis at block 30. This is desirable because increasing the size of some pipes within the network may allow the minimum acceptable size of other pipes to be reduced. However, an effect of this may be that as a result of the iterative routine some pipes are reduced to below the minimum size that might be dictated by the peak flow analysis calculations. Thus, as a final procedure once the iterative routine has completed, and prior to reporting the final rehabilitation strategy, the peak flow analysis may be performed a further time and any pipes which are found to be below the minimum size suggested by the peak flow analysis can be increased in size accordingly. This is a relatively pragmatic post optimisation procedure. It is conceivable that as a result of such resizing, the maximum default pressure or some internal pipe pressure threshold may possibly be exceeded. However, it is considered that this will be negligible in practice.

Thus, in summary, the above example of the present invention provides a method of optimising a pipe network rehabilitation strategy in a novel way and which further includes novel methods for determining the hydraulic significance of pipes within a pipe network and the required peak flow capacity of any particular pipe within the network.

It will be appreciated by the skilled person that many modifications can be made within the framework outlined above and that the optimisation program could accommodate a variety of additional user specified conditions. For instance, the network planner may place a minimum permissible size for pipes within the network not withstanding that the optimisation process might suggest that smaller pipes would meet flow demands etc. Also, the planner may limit the reduction in size of the rehab.pipe compared with the original pipe to just one or maybe two sizes below the original pipe size. Similarly, the planner may require certain pipe rehabilitation techniques or pipe materials to be used in certain parts of the network. The manner in which these, and other conditions, could be included in the process will be clear to the skilled reader.

It will also be appreciated that the invention is not limited to the optimisation of the networks during a rehabilitation process. For instance, this same procedure could be used as one step in the design process for a new network.

In addition, it will be appreciated that optimisation may be performed by reference to factors other than costs simply by replacing the cost table with any appropriate "preference" list.

It will also be appreciated that certain aspects of the invention, in particular the determination of hydraulic significance and the manner in which peak flow analysis may be made, may have applications outside the optimisation process of the present invention. That is to say, there may be other operations, or optimisation procedures, which could benefit from these particular novel aspects of the present invention independently from the iterative routine which lies at the core of the present optimisation process.

Other possible modifications will be readily apparent to the appropriately skilled person, as will other possible applications of the methods of determining hydraulic significance and of dividing the network into "pipe trees" and "pseudo spurs".

What is claimed is:

1. A method of optimizing a model of a pipe network with respect to a predetermined criteria, the method comprising modifying a starting proposal for a list of pipes within the network model which may be modified by performing the following operations:

i) selecting a first pipe from the pipe list which may be considered for modification;

ii) proposing a modification to the selected pipe which provides an incremental improvement in said criteria;

iii) performing a network analysis of at least one predetermined operating parameter of the network to predict whether a predefined operating limit of said operating parameter will be violated as a result of the modification;

iv) if said network analysis predicts a violation of said predefined operating limit, then rejecting the proposed modification and removing the respective pipe from consideration for any further modification;

v) selecting a next pipe from the pipe list which may be considered for modification and performing operations (ii) to (iv) on the selected pipe;

vi) repeating operation (v) until all pipes which may be considered for modification have been selected; and vii) repeating operations (i) and (vi) until no pipes of the pipe list remain to be considered for further modification.

2. A method according to claim 1, wherein said at least one predetermined operating parameter is the peak flow rate any particular pipe must be able to provide, said peak flow rate for said any particular pipe determined by:

a) totaling the peak flow for the whole network and distributing this across the network to give a network peak flow demand on said any particular pipe;

b) deriving a local peak flow demand representative of the localized demand on said any particular pipe of the network; and c) combining the network peak flow demand with the local peak flow demand to arrive at a peak flow rate demand for said any particular pipe in the network.

3. A method according to claim 2, wherein the determination of the local peak demand flow comprises:
   a) performing a network analysis on the network model at the peak flow time to determine the network peak flow pattern;
   b) identifying each source or pseudo-source within the network model.
   c) identifying each node which receives convergent in flows from two or more pipes within the network model;
   d) treating each source and/or node identified above as the origin of a pipe tree having one or more branches each comprising one or more pipes, each branch terminating at a downstream convergent node or terminal node;
   e) estimating the local demand on each pipe tree branch and assuming this estimate to be the local peak flow demand for said any particular pipe in the respective branch.

4. A method according to claims 3, wherein the network peak flow demand is determined by estimating the through flow through each pipe tree branch required to meet network demand downstream of the branch, giving a branch through flow demand, and for each pipe summing the branch through flow demand for each branch of which that pipe is a part to arrive at the network peak demand for that pipe.

5. A method according to claim 4, wherein the branch through flow is taken to be the contribution made by the flow through that branch to the network flow immediately downstream of the node at which the branch terminates.

6. A method according to claim 5, wherein said contribution is obtained as the ratio of the flow through the downstream pipe of the branch to the total network flow converging at the node at which the downstream pipe of the branch terminates, multiplied by the total network flow immediately downstream of the node.

7. A method according to claim 3, wherein the local peak demand for said any particular pipe is estimated by determining the relative demand of the users supplied by each pipe in a pipe tree branch, and estimating the required flow through each pipe in the pipe tree branch required to meet the local demand on the pipe tree branch.

8. A method according to claim 7, wherein said estimating comprises combining the direct local peak demand on each pipe in a pipe tree branch with an indirect local demand on each pipe which is the contribution made by flow through the respective pipe to the direct local demand on each downstream pipe in the same pipe tree branch.

9. A method according to claim 1, wherein the starting proposal is selected as the proposal offering the greatest optimization of said predetermined criteria from a database of possible proposals available for consideration.

10. A method according to claim 9, wherein said starting proposal is taken as an initial starting proposal and further comprising the operations of:
    a) performing a first revision of the initial starting proposal to revise the proposal for at least some of the pipes in the pipe list to a proposal less likely to result in a violation of said predefined operating limit;
    b) performing a network analysis of said at least one predetermined operating parameter of the network to predict whether the predefined operating limit will be violated on the basis of said first revision;
    c) if said network analysis predicts a violation of said predefined operating limit, then performing a second revision of the starting proposal for each pipe in the list, said second revision comprising adopting a proposal for each pipe which is least likely to produce a violation in said predefined operating limit from the possible proposals available for consideration.

11. A method according to claim 10, wherein in performing said first revision the proposal for each of the pipes in the pipe list is revised by proposing an increased size for each pipe compared to the size proposed for the initial starting proposal.

12. A method according to claim 11, wherein in performing the first revision the proposal for a selection of the most hydraulically significant pipes is increased in size by a greater magnitude than the proposal for pipes of lesser hydraulic significance.

13. A method according to claim 10, wherein the pipe list comprises existing pipes selected for rehabilitation within the pipe network and further comprising the following operations:
    d) performing a network analysis to determine whether the second revision of the starting proposal is predicted to result in a violation of said at least one predefined operating limit;
    e) if no operating limit violation is predicted, adopting said second revision as the starting proposal, otherwise performing a third revision of the starting proposal corresponding to the existing pipes in the network;
    f) performing a network analysis to determine whether the existing network is predicted as producing a violation of said at least one predefined operating limit; and
    g) if the network analysis predicts a violation then adopting the second revision as the starting proposal, otherwise increasing the size of each pipe proposal above the size of the corresponding existing pipe by a single size step.

14. A method according to claim 1, wherein the modification of operation (ii) is selected from a database of possible modifications.

15. A method according to claim 14, wherein the possible modifications are ordered in said database by reference to the magnitude of the improvement they provide in said criteria.

16. A method according to claim 15, wherein the modification operation (ii) comprises selecting from the database of possible modifications the modification which provides the smallest improvement in said criteria.

17. A method to claim 14, wherein the criteria is cost and the modification operation (ii) proposes a modification selected from a database of possible modifications and their associated costs, wherein the selected modification is the modification providing the smallest decrease in costs from the current proposal.

18. A method according to claim 1, wherein the list of pipes comprises a selection of pipes from the network model.

19. A method according to claim 18, wherein the pipe list comprises a selection of pipes to be rehabilitated within the model of a pipe network modeled by the network model.

20. A method according to claim 18, wherein the pipe list is compiled by performing a filter operation on the full pipe list to select pipes satisfying specified filter conditions.

21. A method according to claim 1, wherein the pipes are selected for modification in an order based on the hydraulic significance of each pipe within the network model.

22. A method according to claim 21, wherein the pipe ordering is the reverse of their hydraulic significance.

23. A method according to claim 1, wherein the model of a pipe network modeled is a water supply and/or distribution network.

24. A method according to claim 23, wherein the network is a model of a predefined metering district of a water supply and/or distribution network.

25. A method according to claim 1, wherein said at least one predetermined operating parameter includes one or more of a maximum acceptable hydraulic gradient, minimum and maximum permissible pressures specified for elements of the network, minimum and maximum flow rates through particular elements of the network, minimum tank levels and minimum and maximum permissible pipe sizes.

26. A method according to claim 1, wherein the list of pipes comprises every pipe in the network model.

27. A method according to claim 1, wherein said network model is a part of a larger network or network model.

28. A method according to claim 1, wherein said predetermined criteria is the cost of installing or rehabilitating pipes within the network, or of operating the network.

29. A computer program comprising computer readable program code for executing a method according claim 1.

30. A program storage device readable by a machine and encoding a program of instructions for executing the method according to claim 1.

31. A computer system comprising means for operating a method according to claim 1.

32. A method of determining peak flow rate demands on pipes within a model of a pipe network, the method comprising:
  a) totaling the peak flow rate demands for the whole network and distributing this across the network to give a network peak flow demand on each pipe;
  b) deriving a local peak flow demand representative of the localized demand on each pipe of the network; and
  c) combining the network peak flow demand with the local peak flow demand to arrive at a peak flow rate demand for each pipe in the network.

33. A method according to claim 32, wherein the derivation of the local peak flow demand comprises:
  a) performing a network analysis on the network model at the time of peak flow to determine the network peak flow pattern;
  b) identifying each source or pseudo-source within the network model;
  c) identifying each node which receives convergent in flows from two or more pipes within the network model;
  d) treating each source and/or node identified above as the origin of a pipe tree having one or more branches each comprising one or more pipes, each branch terminating at a downstream convergent node or terminal node;
  e) estimating a local demand on each pipe tree branch and assuming this estimate to be the local peak flow demand for each pipe in the respective branch.

34. A method according to claim 30, wherein the network peak flow demand is determined by:
  i) estimating the through flow through each pipe tree branch required to meet network demand downstream of each said pipe tree branch to derive a branch through flow demand for each said pipe tree branch; and
  ii) for each pipe, summing the branch through flow demand of each said pipe tree branch that includes the said each pipe to arrive at the network peak demand for the said pipe.

35. A method according to claim 34, wherein the branch through flow is taken to be the contribution made by the flow through that branch to the network flow immediately downstream of the node at which the branch terminates.

36. A method according to claim 35, wherein said contribution is obtained as the ratio of the flow through the downstream pipe of the branch to the total network flow converging at the node at which the downstream pipe of the branch terminates, multiplied by the total network flow immediately downstream of the node.

37. A method according to claim 33, wherein the local peak demand for each pipe is estimated by determining a relative demand of the users supplied by each pipe in a pipe tree branch, and estimating the required flow through each pipe in the pipe tree branch required to meet the local demand on the pipe tree branch.

38. A method according to claim 37, wherein said estimating comprises combining a direct local peak demand on each pipe in a pipe tree branch with an indirect local demand on each pipe which is the contribution made by flow through the respective pipe to the direct local demand on each downstream pipe in the same pipe tree branch.

39. A computer program comprising computer readable program code for executing a method according claim 32.

40. A program storage device readable by a machine and encoding a program of instructions for executing the method according to claim 32.

41. A computer system comprising means for operating a method according to claim 32.

42. A method of determining the hydraulic significance of each of a list of pipes within a model of a pipe network, the method comprising:
  i) performing a network analysis on the network model to determine the flow patterns through the network at a given time;
  ii) counting the number of instances of each pipe occurring in a flow path between a source node defined by the network model and the boundary of the network model, and using the instance count for each pipe as the indication of the hydraulic significance of that pipe within the network, such that pipes with a higher instance count are considered to be more hydraulically significant than pipes with a lower instance count.

43. A method according to claim 42, wherein operations (i) and (ii) are performed for a number of different times over a predetermined time period and the instance count of each pipe determined at each time is summed to give a total instance count for each pipe which is used as an indication of a hydraulic significance of that pipe within the network.

44. A method according to claim 43, wherein the times are 30 minute intervals over a 24 hour period modeled by the network.

45. A method according to claim 42 wherein the instance count is made by considering each node defined by the network model in turn and the pipe or pipes which converge or terminate at each node, and increasing the instance count for each pipe occurring at least once in a flow path to that node through the or each pipe terminating or converging at that node.

46. A method according to claim 42, wherein the instance count is made by considering each pipe in turn and implementing the instance count for each pipe occurring at least once in a flow path through the selected pipe.

47. A computer program comprising computer readable program code for executing a method according claim 42.

48. A program storage device readable by a machine and encoding a program of instructions for executing the method according to claim 42.

49. A computer system comprising means for operating a method according to claim 42.

50. A method of according to claim 21, wherein the hydraulic significance of each pipe of the pipe list is determined by:
  i) performing a network analysis on the network model to determine the flow patterns through the network at a given time;
  ii) counting the number of instances of said each pipe occurring in a flow path between a source node defined by the network model and the boundary of the network model, and using the instance count for each pipe as the indication of the hydraulic significance of said each pipe within the network, such that pipes with a higher instance count are considered to be more hydraulically significant than pipes with a lower instance count.

51. A method according to claim 50, wherein operations (i) and (ii) are performed for a number of different times over a predetermined time period and the instance count of said each pipe determined at each time is summed to give a total instance count for said each pipe which is used as an indication of a hydraulic significance of said each pipe within the network.

52. A method according to claim 51, wherein the times are 30 minute intervals over a 24 hour period modeled by the network.

53. A method according to claim 50, wherein the instance count is made by considering each node defined by the network model in turn and the pipe or pipes which converge or terminate at each node, and increasing the instance count for each pipe occurring at least once in a flow path to that node through said each pipe terminating or converging at that node.

54. A method according to claim 50, wherein the instance count is made by considering said each pipe in return and implementing the instance count for each said pipe occurring at least once in a flow path through the selected pipe.

* * * * *